(12) United States Patent
Veckenstedt et al.

(10) Patent No.: US 8,070,097 B2
(45) Date of Patent: Dec. 6, 2011

(54) MOBILE DIVIDER FOR AN AIRCRAFT

(75) Inventors: Christian Veckenstedt, Hamburg (DE); Holger Warner, Jork (DE)

(73) Assignee: Airbus Deutschland GmbH (DE)

( * ) Notice: Subject to any disclaimer, the term of this patent is extended or adjusted under 35 U.S.C. 154(b) by 885 days.

(21) Appl. No.: 12/082,813

(22) Filed: Apr. 14, 2008

(65) Prior Publication Data
US 2008/0263974 A1 Oct. 30, 2008

Related U.S. Application Data

(60) Provisional application No. 60/923,806, filed on Apr. 16, 2007.

(30) Foreign Application Priority Data

Apr. 16, 2007 (DE) .......................... 10 2007 017 853

(51) Int. Cl.
*B64D 11/00* (2006.01)
(52) U.S. Cl. .................................... 244/118.5; 52/220.2
(58) Field of Classification Search ............... 244/118.1, 244/118.2, 118.5, 118.6; 52/220.2, 220.7, 52/220.8; 248/53, 56, 61
See application file for complete search history.

(56) References Cited

U.S. PATENT DOCUMENTS

| | | | |
|---|---|---|---|
| 3,197,556 A * | 7/1965 | Simon | 174/153 G |
| 4,203,639 A | 5/1980 | VandenHoek et al. | |
| 5,194,192 A * | 3/1993 | Seebode | 264/35 |
| 5,489,172 A * | 2/1996 | Michler | 410/105 |
| 6,019,321 A * | 2/2000 | Carlson et al. | 248/49 |
| 6,523,779 B1 * | 2/2003 | Michel | 244/118.5 |
| 2005/0279887 A1 * | 12/2005 | Bouchet et al. | 244/121 |
| 2006/0207792 A1 | 9/2006 | Sakurai | |

FOREIGN PATENT DOCUMENTS

| | | |
|---|---|---|
| DE | 2911065 | 11/1979 |
| WO | 2005110843 | 11/2005 |

* cited by examiner

*Primary Examiner* — Tien Dinh
*Assistant Examiner* — Michael Kreiner
(74) *Attorney, Agent, or Firm* — Lerner, David, Littenberg, Krumholz & Mentlik, LLP

(57) ABSTRACT

A mobile divider for an aircraft or an aircraft cabin with a first wall section, a second wall section that is essentially arranged parallel to the first wall section and a cable duct that is arranged between the first wall section and the second wall section. The cable duct protrudes over an edge of the first wall section and an edge of the second wall section in at least one location. This makes it possible to route a supply line such as, for example, an electric line in the cable duct within the divider and also in the transition region between the divider and, for example, a cabin supply channel such that the supply line is not visible to a passenger traveling in the cabin, particularly in the transition region from the mobile divider into the supply channel.

11 Claims, 5 Drawing Sheets

MOBILE DIVIDER FOR AN AIRCRAFT

CROSS-REFERENCE TO RELATED APPLICATIONS

This application claims the benefit of the filing date of U.S. Provisional Patent Application No. 60/923,806 filed Apr. 16, 2007, the disclosure of which is hereby incorporated herein by reference.

BACKGROUND OF THE INVENTION

The present invention pertains to a mobile divider, especially a mobile divider for an aircraft, particularly for an aircraft cabin.

In aircraft, particularly in modern commercial aircraft, the different classes such as, for example, First Class, Business Class and Economy Class are separated from one another by dividers. The demand for seats in the different classes in a commercial aircraft depends on the booked number of seats in the corresponding class such that it may become necessary, for example, to position a divider between two classes at a different location between two flights. This is the reason why mobile dividers are provided that can be used according to the desired position. It frequently occurs that electrical devices are arranged in the region of the divider and, for example, need to be supplied with electric energy such that the divider also needs to be designed for the installation of corresponding lines. In this respect, one encounters the particular problems of how a line should be routed in or on the divider and, in particular, how the transition to a cabin supply channel can be realized.

SUMMARY OF THE INVENTION

According to the present invention there may be provided a mobile divider for an aircraft that allows the routing of a supply line, particularly a concealed routing of supply lines in the region of the divider, as well as in the transition region, for example, to a cabin supply channel.

According to one advantageous embodiment of the invention, a mobile divider for an aircraft or an aircraft cabin is made available which comprises a first wall section, a second wall section that is arranged essentially parallel to the first wall section and a cable duct that is arranged between the first wall section and the second wall section, wherein the cable duct protrudes over an edge of the first wall section and an edge of the second wall section in at least one location.

This makes it possible to route a supply line such as, for example, an electric line in the cable duct within the divider and also in the transition region between the divider and, for example, a cabin supply channel such that the supply line is not visible to a passenger traveling in the cabin, particularly in the transition region from the mobile divider into the supply channel. Due to the arrangement of the cable duct between a first wall section and a second wall section of the mobile divider, it is possible to realize an optically agreeable solution for routing supply lines, particularly electric lines, such that they are not visible to the passenger, particularly if it is necessary to supply electrical devices situated on or in the mobile divider such as, for example, flatscreen monitors, etc.

According to one exemplary embodiment of the invention, the mobile divider is provided with a holding device that comprises at least one flat region, wherein the flat region comprises a recess and the recess can be penetrated by the cable duct.

This makes it possible to mount the mobile divider, for example, on stationary support structures of the cabin by the holding device in order to thusly divert the dynamic forces that can act upon the mobile divider during a flight to the stationary support structure of the cabin. Since the cable duct penetrates a recess in the holding device, supply lines can be routed from the divider, for example, into a cabin supply channel through the cable duct and through the holding device such that these lines are not visible to the passenger.

According to one exemplary embodiment of the invention, the recess is designed with respect to the cable duct in such a way that it represents a floating bearing with respect to the cable duct.

According to one exemplary embodiment, the floating bearing has degrees of freedom orthogonally to the flight direction, but no degrees of freedom in the flight direction.

This enables the divider to move laterally in the aircraft due to distortions or shocks. The flight direction that is critical for flying operations, in contrast, does not allow any degree of freedom such that the positive and negative acceleration forces occurring, in particular, during takeoffs and landings cannot move the divider in the flight direction within the holding device.

According to one exemplary embodiment of the invention, the recess comprises an edge region that is covered by an elastic collar in such a way that the collar lies at least partially between the edge region of the recess and the cable duct.

This makes it possible to absorb or dampen finer vibrations by the elastic collar without significantly restricting the mobility in the directions orthogonally to the flight direction. This mobility of the cable duct within the holding device in directions that lie orthogonally to the flight direction also allows a simpler installation and removal during a relocation of the mobile divider.

According to one exemplary embodiment of the invention, the cable duct has an elongate cross section, the longest dimension of which extends in the direction of a dimension of the wall sections.

This makes it possible to install a multitude of cables and supply lines without having to realize the divider with a large thickness. In this case, the cables and supply lines may essentially lie adjacent to one another in the cable duct with elongate cross section. For example, several sections may also be provided in the cable duct in the longitudinal direction, for example, in order to separate supply lines that could possibly interfere with one another, e.g., due to a lack of electromagnetic compatibility. A division of the cable duct into sections may also be necessary for reasons of fire protection engineering.

According to one exemplary embodiment of the invention, the holding device comprises at least one clamping device that is designed for being mounted on a stationary cabin element.

A clamping device makes it possible to clamp the holding device, for example, on an elongate profile in the form of a simple clamping process such that, in particular, a high variability with respect to the mounting points is achieved because the clamping connection eliminates the need for any engagement. In contrast to solutions with screw connections or plug-type connections, this makes it possible to realize, in particular, a fast and flexible installation. The elongate profile may lie in the direction of an aisle such that the divider can be clamped in any position along the aisle.

According to one exemplary embodiment of the invention, the clamping device has a rapid-action closure that is designed for being mountable on a stationary cabin element.

This makes it possible to quickly install and remove the mobile divider without the time-consuming manipulation of a screw clamp.

According to one exemplary embodiment of the invention, the rapid-action closure comprises an eccentric clamping device.

An eccentric clamping device makes it possible to carry out the clamping process in a fast and effortless fashion, for example, by simply throwing a lever that is connected to a cam in such a way. During a movement into a second position from a first position, in which no clamping action takes place, the cam causes the actual clamping device to move in such a way that it non-positively engages at the corresponding location in order to thusly absorb the required forces in the X-direction, i.e., in the flight direction of the aircraft.

According to one exemplary embodiment of the invention, the clamping device comprises clamping jaws that can be connected to an oval profile of the stationary cabin element in a non-positive and at least partially positive fashion.

Due to the fact that the clamping jaws can not only be non-positively connected in order to absorb the forces in the flight direction, but also in an at least partially positive fashion, the clamping force can be distributed over a larger surface of the profile such that no damages to the profile occur. For example, the profile may consist of an oval, round or square profile, but may also have any other cross-sectional shape. An oval profile has adequate properties, for example, with respect to bending moments and makes it possible to realize an arrangement that only requires comparatively little space for positioning the clamping jaws, for example, if the oval is arranged upright.

According to one exemplary embodiment of the invention, the clamping device with the clamping jaws is aligned such that it can engage on a profile that essentially extends in the direction of a cabin aisle, frequently in the flight direction.

In instances, in which the direction of the aisle does not correspond to the flight direction, i.e., if the profile does not extend in the flight direction, the recess, particularly an elongate recess in the holding device, may also be turned, i.e., aligned orthogonally to the flight direction. In an instance in which the divider should not be aligned orthogonally to the flight direction, the cable duct with elongate cross section may be realized in a twisted fashion, i.e., in the direction of the divider in the region of the divider and orthogonally to the flight direction in the region of the holding device.

According to one exemplary embodiment of the invention, the mobile divider is furthermore provided with a cover panel that can be separably connected on a side of the holding device that faces the first wall section and the second wall section, wherein the cover panel comprises a recess and the recess can be penetrated by the cable duct.

This makes it possible to divide the functions of absorbing forces and of an optical concealment. For example, the holding device can take over the function of absorbing forces acting upon the mobile divider while a cover panel can take over the function of an optical concealment of the holding device. Since the cable duct can be routed through a recess in the cover panel, the lines or supply lines extending through the cable duct are no longer visible to the passenger. The panel furthermore conceals the holding device such that the mounting elements are no longer visible. The panel can be separably connected to the holding device in order to simplify the installation. The connection may be realized by snap-on connections, screws, clamps or magnets, but is not restricted to these forms of connections.

According to one exemplary embodiment of the invention, the cover panel comprises at least one first partial panel and one second panel that can be engaged with the first partial panel, wherein the partial panels encompass the recess in the cover panel in the engaged state.

Due to the two partial panels, the cover panel can be separated, for example, such that the cover panel can also be attached or removed when the mobile divider with the cable duct protruding over the side wall sections is already installed. For example, one of the two partial panels may have the shape of a "U", the yoke of which can be essentially closed by the second partial panel such that the recess in the cover panel is encompassed.

According to one exemplary embodiment of the invention, the mobile divider comprises at least one lead-through that is designed for routing a line to be installed in the cable duct through at least one of the first wall section and the second wall section.

This makes it possible to route a supply line that extends in the cable duct and needs to be connected, for example, to a flatscreen monitor through a wall section of the mobile divider. However, the supply lines do not have to consist of electric supply lines only. It would also be possible, for example, to provide air supply lines, etc., in the cable duct. In this respect, the term cable duct should not be interpreted such that it is restricted to cables only, but rather as a duct that may also serve for routing other supply lines. The supply lines may also be integrally connected to the cable duct, for example, by using a section of the duct as aeration and ventilation supply line or by encapsulating electric lines into the walls of the cable duct. The lead-through may consist of an opening, through which a line can be routed or through which an outwardly routed electric contact extends that does not necessarily require a physical opening.

According to one exemplary embodiment of the invention, an aircraft is provided with an inventive mobile divider.

It should be noted that the individual characteristics of the embodiments described above and below naturally may also be combined with one another and that such combinations may result in effects that exceed the sum of the individual effects.

These and other aspects of the present invention are described and elucidated with reference to the exemplary embodiments described below.

BRIEF DESCRIPTION OF THE DRAWINGS

Exemplary embodiments are described below with reference to the following figures.

DETAILED DESCRIPTION

Figure 1:
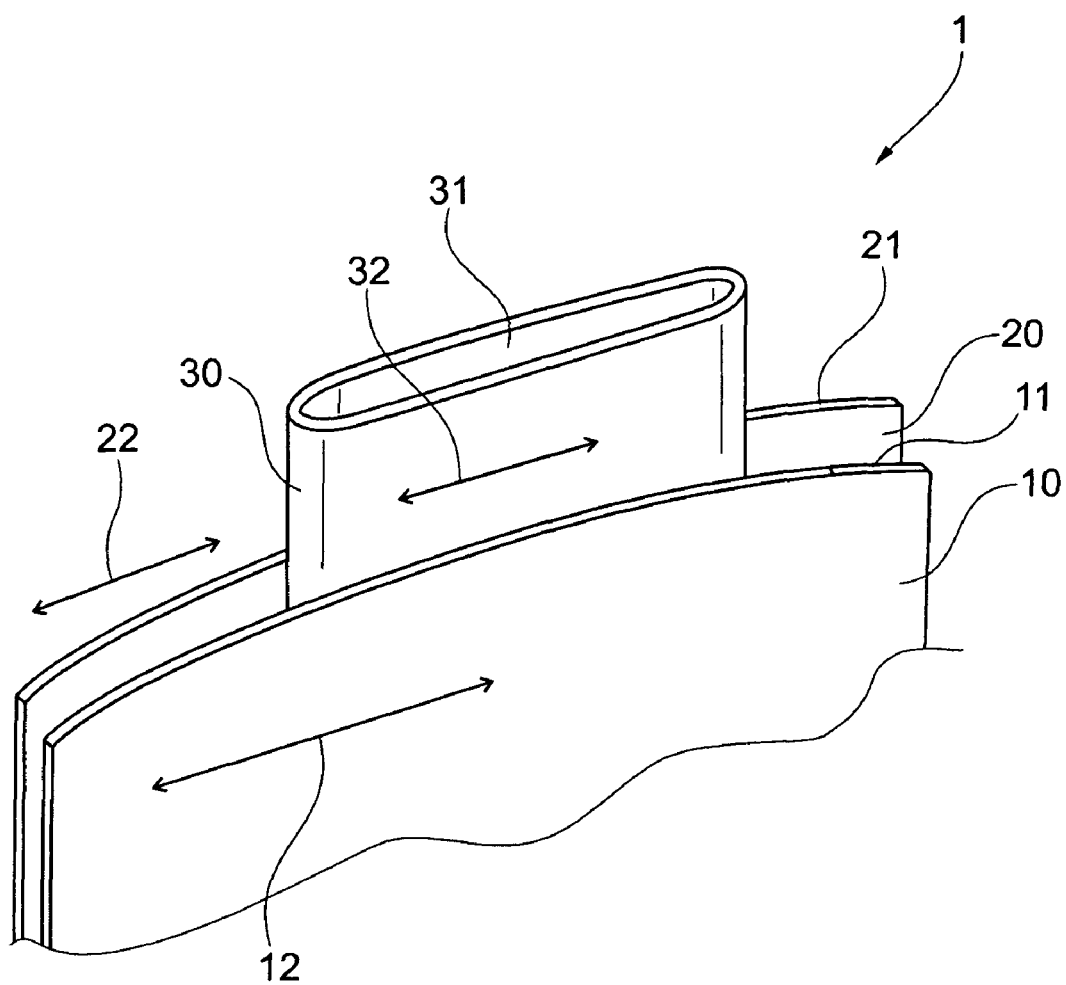
FIG. 1 shows a perspective representation of one exemplary embodiment of the invention.

FIG. 1 shows a mobile divider for an aircraft, particularly for an aircraft cabin, with a first wall section 10, a second wall section 20 that is essentially arranged parallel to the first wall section 10 and a cable duct 30 that is situated between the first wall section 10 and the second wall section 20. The cable duct 30 protrudes over the edge 11 of the first wall section 10 and an edge 21 of the second wall section 20 in at least one location. The edges 11, 21 of the wall sections may consist, for example, of the upper boundary of the mobile divider that, for example, may have a curved shape such that it laterally follows the cabin profile.

In the embodiment shown, the cable duct 30 has an elongate cross section 31, wherein the dimension of the longest axis of the cross section 32 extends in the direction of a dimension 12, 22 of the wall sections 10, 20. In this case, the dimension of the wall sections refers to the entirety of directions that lie in the plane essentially represented by the wall sections 10, 20. The cable duct is arranged in a sandwich between the wall sections 10, 20.

The wall sections 10, 20 may, for example, be connected to the cable duct 30, wherein the wall sections 10, 20 may also be connected to one another, for example, by not-shown webs. The connection may be realized in the form of riveted, bonded, screwed or snap-in connections. In this case, the cable duct 30 may be designed in such a way that it not only serves for routing supply lines, but is also able to absorb all forces acting upon the mobile divider such that these forces can be diverted to the fixed installations of the cabin. The cable duct may serve as a quasi support structure of the divider or at least form a supporting component of a support structure.

Figure 2:
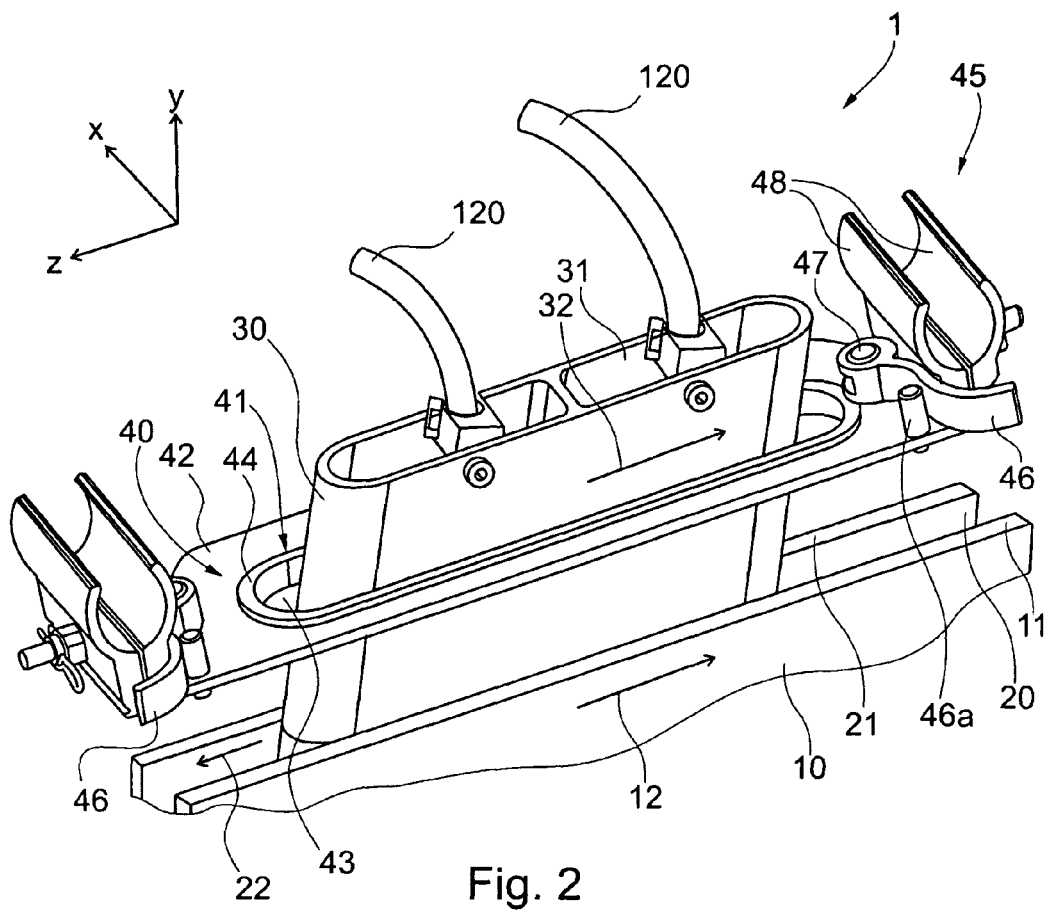
FIG. 2 shows another exemplary embodiment of the invention with a holding device and a clamping device.

FIG. 2 shows a mobile divider 1 for an aircraft cabin, wherein the mobile divider 1 is furthermore provided with a holding device 40 that comprises at least one flat region 42, and wherein the flat region 42 comprises a recess 43 and the recess 43 can be penetrated by the cable duct 30.

The holding device 40, for example, in the form of a divider bracket needs to absorb loads in the X-direction that usually corresponds to the flight direction and simultaneously allow displacements of the divider in the Y- and Z-directions. For this purpose, for example, the holding device described in detail with reference to FIG. 2 is provided on the divider. The mobile divider is rigidly mounted, for example, on an oval pipe in a cabin supply channel. In this case, the mounting is realized as shown in FIG. 2, namely by an oval cable duct, i.e., a cable duct with an elongate cross section, through which cables and supply lines, for example, of electric components can be routed within the divider. This oval cable duct is held by a profile in the form of the holding device 40 that serves as a floating bearing and is equipped with a rubber collar 44 in order to prevent vibration noises. The profile in the form of the holding device is fixed, for example, on a power supply channel rail (PSC rail) by a clamping connection 45. In the drawings shown, this rail has an oval profile, but the principle of a rapid-action closure by an eccentric clamping device 46, 47 is also suitable for use in connection with other cross-sectional geometries. The clamping force required for withstanding a load amounting to nine-times the acceleration of gravity in the flight direction (X-direction) is generated by the two eccentric clamping devices 46, 47, 48 shown.

Figure 3:
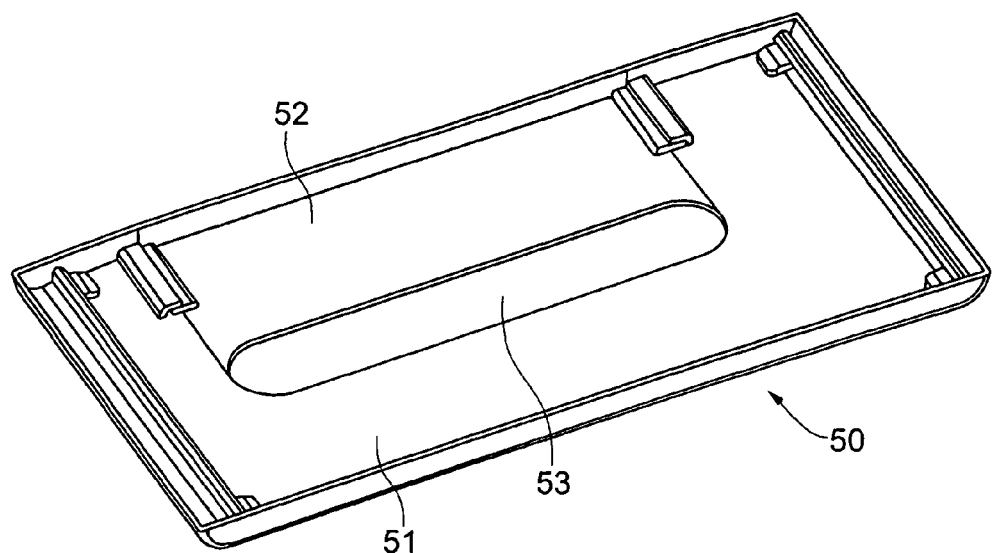
FIG. 3 shows a cover panel according to one exemplary embodiment of the invention.

A cover device in the form of a cover panel shown in FIG. 3 covers the divider bracket or the holding device 40 and can be directly connected to the holding device 40 such that no separate bracket is required for attaching the cover panel device. The mounting can be realized with snap-on connections, screws, quarter-turn fasteners or magnets, but is not limited to these types of connections.

The cable duct 30 protruding over the wall sections 10, 20 therefore extends through the holding device 40 in order to make it possible to route supply lines 120 situated in the cable duct from the mobile divider, for example, into a cabin supply channel such that the lines 120 are not visible to the passenger. In the embodiment shown in FIG. 2, an edge region 41 of the recess 43 is provided with an elastic collar, for example, a rubber collar 44, such that the cable duct 30 does not lie on the edge of the recess 43 in an unprotected fashion and, for example, cannot become scratched or even damaged. In the embodiment shown, the recess has an elongate shape and is realized such that it represents a floating bearing with respect to the cable duct 30. The floating bearing allows degrees of freedom in the directions Y and Z that extend orthogonally to the flight direction X, but no degrees of freedom in the flight direction itself. Consequently, the forces occurring between the mobile divider 1 and fixed cabin installations 110, on which the holding device 40 is mounted by the clamping devices 45, for example, during takeoffs and landings, can be absorbed without excessive movements of the mobile divider occurring in the X-direction, i.e., the flight direction.

In this case, the holding device 40 may be provided with clamping devices 45 that feature, for example, two clamping jaws 48 in the embodiment shown, wherein the shape of said clamping jaws is adapted, for example, to an oval hollow profile extending in the X-direction, i.e., the flight direction. The not-shown profile naturally may also extend in a direction other than the flight direction, particularly in the direction of a cabin aisle that does not extend parallel to the flight direction X. This allows a flexible relocation and installation of the holding device on the fixed cabin installations. In the not-shown instance, in which the aisle direction does not correspond to the flight direction X, i.e., if the profile does not extend in the flight direction, the elongate recess in the holding device may also be turned, i.e., aligned orthogonally to the flight direction. In instances, in which the divider should not be aligned orthogonally to the flight direction, the cable duct with elongate cross section may be realized in a twisted fashion, i.e., in the direction of the divider in the region of the divider and orthogonally to the flight direction in the region of the holding device. In this case, the clamping device 45 may be provided, for example, with a cam 47 and a clamping lever 46 in order to move the two clamping jaws toward one another in the embodiment shown. Naturally, it would also be possible to provide a clamping device, in which a clamping process is realized by pressing the clamping jaws 48 outward. The clamping lever 46 can be secured, for example, with a safety pin 46a.

The intermediate space formed by the two wall sections 10, 20 may be provided, for example, with a not-shown cover on the edges such that this intermediate space is not exposed. For example, this intermediate space may also be filled, for example, with foams or a corresponding structural material.

FIG. 3 shows a cover panel 50 that comprises a recess 53. The cover panel 50 may consist, for example, of partial panels 51, 52 that can be engaged with one another, wherein the partial panels 51, 52 encompass the recess 53 in the cover panel 50 in the engaged state. This makes it possible to initially utilize one partial panel 51 as a cover, wherein the recess 53 is exposed in this case by removing the second panel 52 in such a way that the first panel 51 with the U-shape shown can be pushed around the cable duct 30 in the already fixed position. Subsequently, the second partial panel 52 of the embodiment shown is engaged with the first partial panel 51. Naturally, it would also be possible to utilize more than only two partial panels as long as it is ensured that the complete segmented cover panel can also be attached if the mobile divider is already installed on stationary installations in the cabin.

In this case, the cover panel can be separably connected on one side of the holding device 40 that faces the first wall section 10 and the second wall section 20. This makes it possible to remove the cover panel before the relocation or the installation and removal of the mobile divider. The term can be connected on one side refers to the position of the panel relative to the holding device, but not necessarily to the position of the mounting elements. The mounting elements may also lie on the side of the holding device that faces away from the wall sections as it is the case, e.g., with snap-on connections that engage behind one another.

Figure 4:
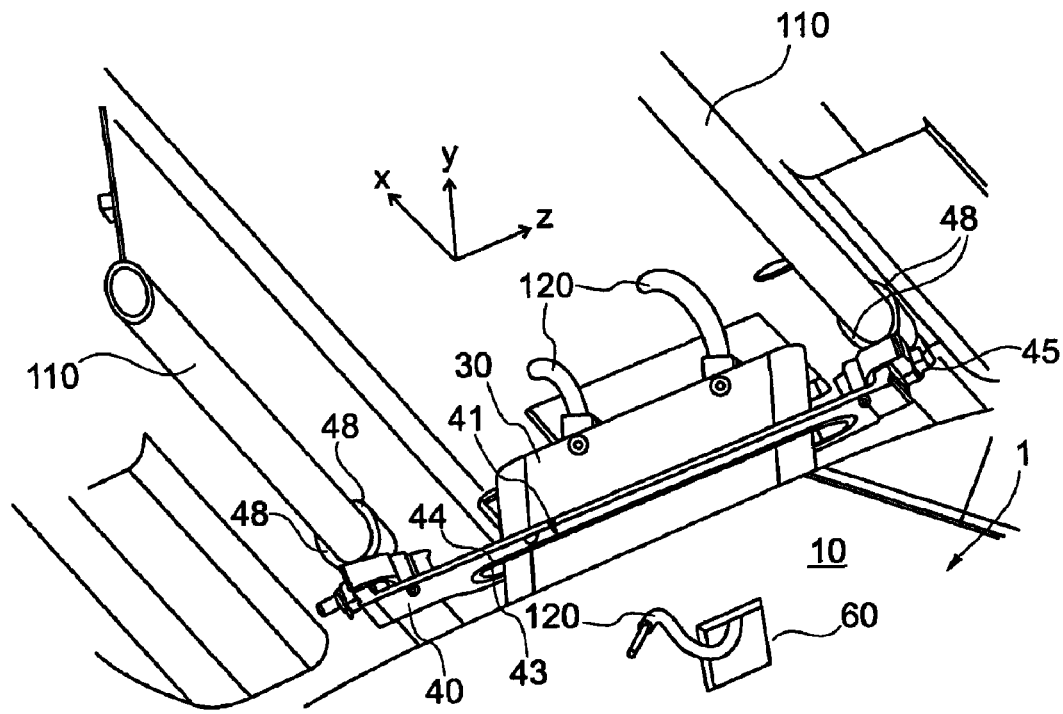
FIG. 4 shows an installation position in the region of the cable duct that protrudes over the wall section and a holding device in the region of the cabin roof channel.

FIG. 4 shows a mobile divider 1 in a position, in which the holding device 40 is mounted on profiles 110 that extend in the X-direction in the embodiment shown by the clamping device 45. In this case, the clamping jaws 48 not only engage non-positively on the profiles 110, but also in an at least partially positive fashion such that the surface of the profiles 110 is not damaged due to the large contact surfaces of the clamping jaws 48 resulting thereof. The profiles 110 can not only be realized in an oval or circular fashion, but may also have any other cross-sectional shape.

The cable duct 30 is also able to move in the recess 43 of the holding device 40 to a certain degree in the Y- and Z-directions with the elastic collar 44 that is situated between the wall region 41 of the holding device 40 and the cable duct 30, but its movement in the X-direction is restricted. Due to this measure, the recess 43 and the cable duct 30 may jointly represent a floating bearing of sorts that allows a movement in predetermined directions only.

The lines 120 routed into the mobile divider 1 from the region of a cable supply channel that, for example, may also accommodate the profiles 110 are no longer perceivable to the passenger in the finished state of installation due to the cable duct 30 that protrudes over the wall section at this location. The mobile divider 1 may contain a lead-through 60 that makes it possible to route a cable 120 out of the cable duct and through the wall section 10, for example, in order to thusly connect an electrical device in or on the mobile divider. This lead-through may consist of a simple bore, but may also be realized, for example, in the form of an opening that is bordered by a rubber collar in order to fix a cable or supply line 120 extending through this opening 60. The lead-through 60 naturally may be provided in any region of the divider. The cable duct naturally may also feature junctions or additional lead-throughs within the mobile divider in order to route the supply lines. In this case, the supply lines are not limited to electric lines, but may also consist of any other lines such as, for example, ventilation lines for aerating and ventilating a certain cabin region through the mobile divider 1.

Figure 5:
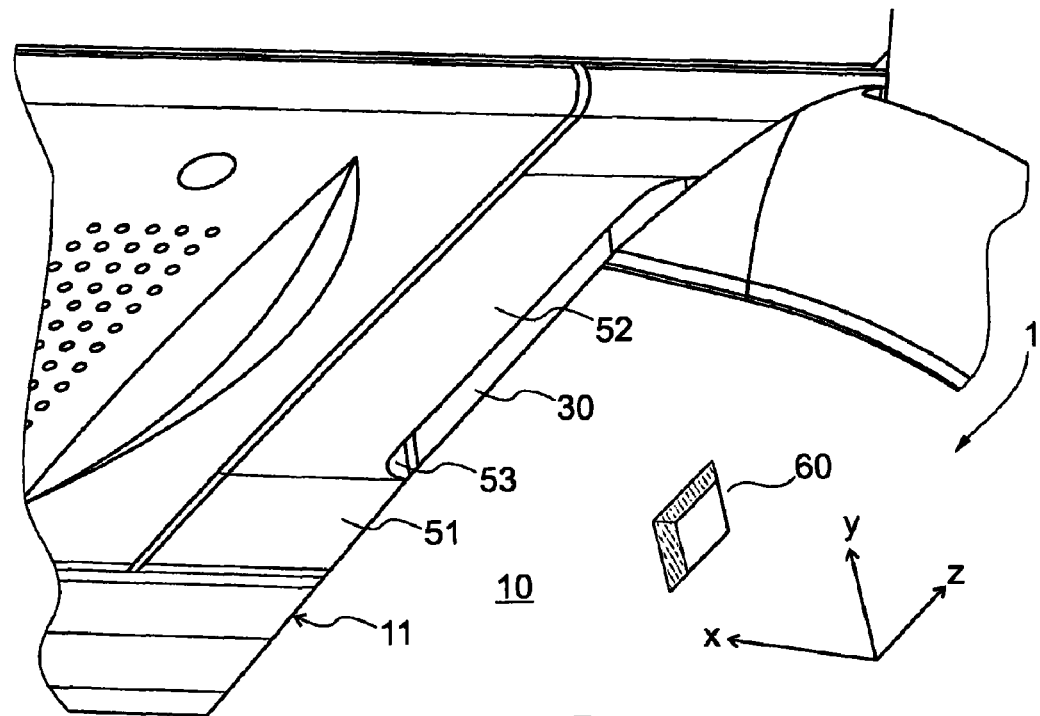
FIG. 5 shows a mobile divider in an installed position with already attached cover panel.

FIG. 5 shows an exemplary embodiment, in which the mobile divider 1 already is rigidly installed and the cable duct 30 extends through a cover panel 50, 51, 52 that consists of two parts in this embodiment. After the mobile divider is fixed on the profiles 110 by the clamping devices 45 or clamping jaws 48 as shown in FIG. 4, the U-shaped partial cover panel 51 may, for example, be laterally guided around the cable duct 30 above the edge 11 of the wall section 10 in order to subsequently engage the second partial panel 52 with the first partial panel 51. In this case, the cover panel may also be realized such that the two partial panels 51, 52 are initially engaged with the one another before they are jointly attached, for example, to the holding device 40 in the form of a cover panel 50, but the arrangement may also be realized such that the first partial panel 51 is positioned and mounted on the holding element 40 before the second partial panel 52 is engaged with the first partial panel 51.

The opening of the "U" may be situated in the X-direction or flight direction as shown in FIG. 5, but the opening of the "U" naturally may also be situated, for example, in the Z-direction, in which case a different installation process may be required.

Figure 6:
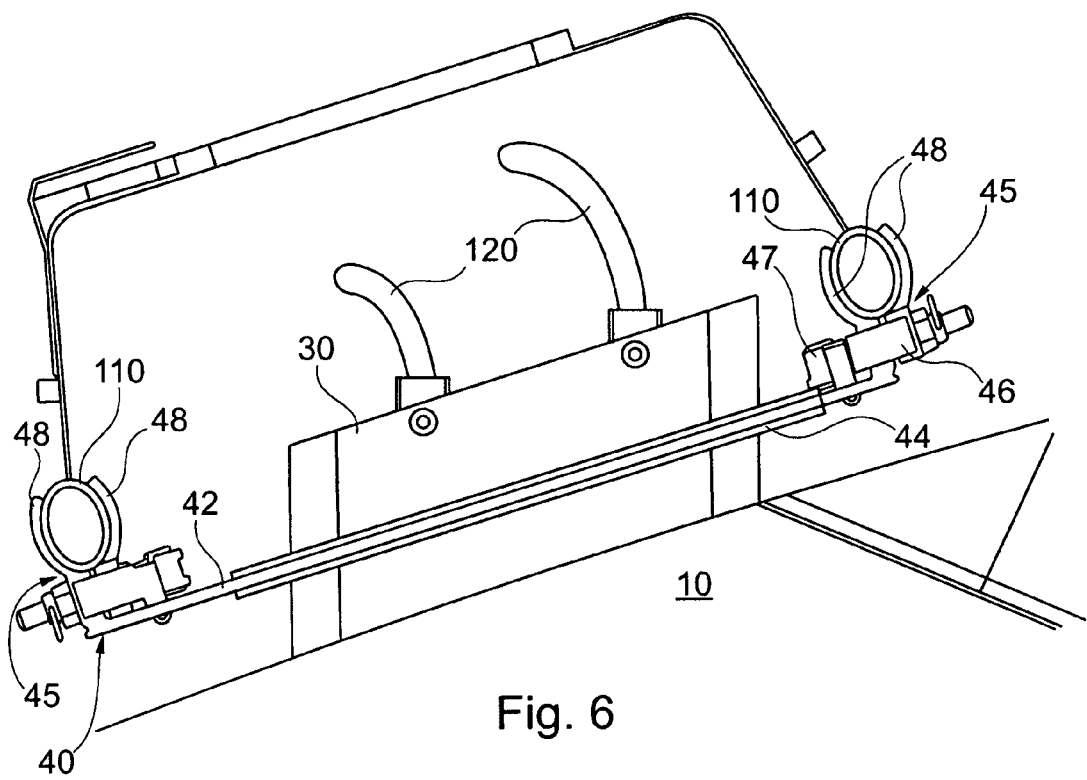
FIG. 6 shows a section through the mobile divider with the cable duct that protrudes over the wall section, as well as a holding device and a clamping device, namely without a cover panel.

FIG. 6 shows a section through a mobile divider 1, in which the cable duct 30 protrudes through the holding device 40 and the holding device 40 is mounted on a profile 110 by the clamping jaws 48 of the clamping device 45, wherein the profile 110 represents a stationary installation in the cabin. The installation, i.e., the clamping process in this embodiment, is carried out in the position shown in FIG. 6. Due to the corresponding design, the installation regions of the clamping device 45 and of the clamping lever 46 of the cam 47 are exposed. The installation region is subsequently covered by attaching a cover panel 50 that covers the installation region in such a way that it is no longer visible to the passengers.

Figure 7:
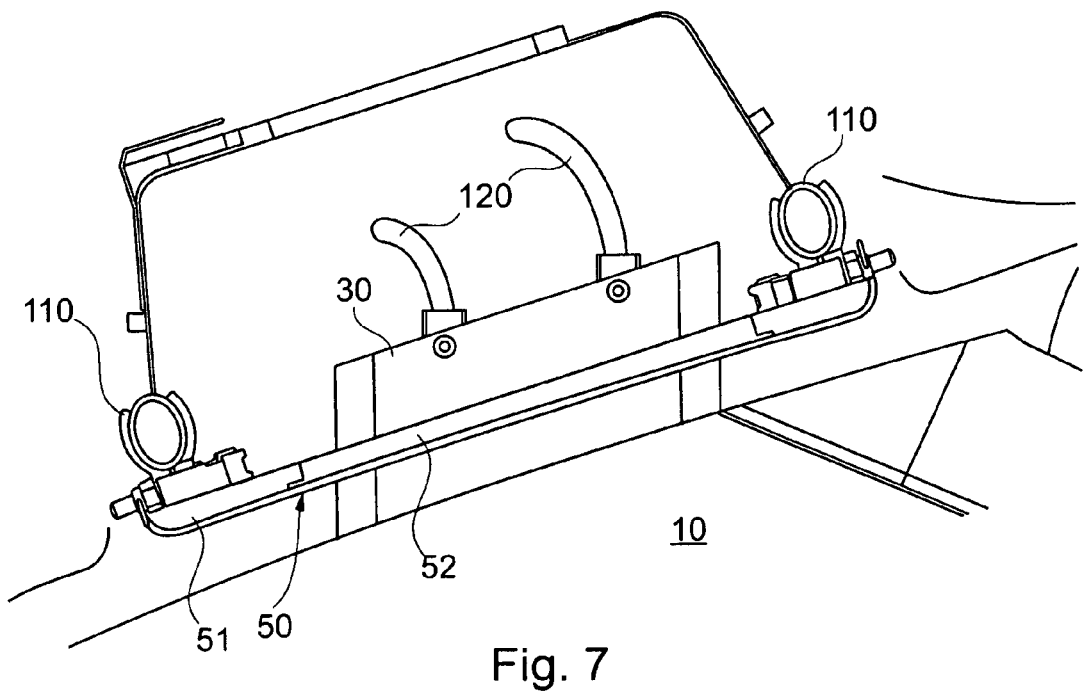
FIG. 7 shows the arrangement according to FIG. 6 with a cover panel.

FIG. 7 shows a sectional representation, in which the installation region is covered by a cover panel, wherein a first partial panel 51 and a second partial panel 52 are engaged in such a way that the region of the cable duct 30 is encompassed. In this case, the cover panel 50 is mounted on the holding device 40. This can be realized, for example, with the aid of screws or snap-on connections, but is not limited to these mounting options.

Figure 8:
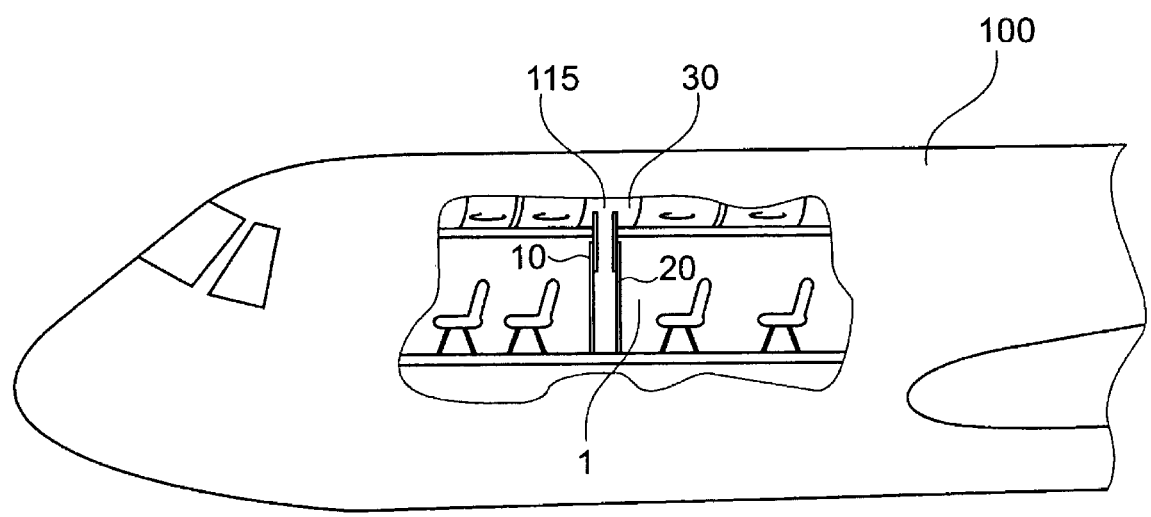
FIG. 8 shows an aircraft with an exemplary arrangement of an inventive mobile divider.

FIG. 8 shows an aircraft 100 according to one exemplary embodiment with an exemplary installation position of the inventive mobile divider 1. In this embodiment, the cable duct 30 of the mobile divider protrudes over the upper edges of the wall sections 10, 20 and into a region that already lies in a cable supply channel 115. Due to these measures, not-shown cables and lines that are routed, for example, from the mobile divider 1 into a cable supply channel 115 are no longer visible to passengers located in the cabin.

The present invention makes it possible to provide a mobile divider that can be installed and removed within a very short period of time such that the shortest relocation times possible can be realized in the cabin region. In addition, it is possible to route cables through the divider such that passengers located in the cabin are unable to see the lines at the transition between the divider and the roof region of the cabin. Due to the combined functions of a holding device, a cable duct and a mounting, the arrangement has a relatively low weight and can be cost-efficiently manufactured due to the simple component design. A clamping arrangement makes it possible to continuously displace the mobile divider in the X-direction, i.e., in the flight direction (frequently also in the direction of the cabin aisle). Practically no tool is required for the installation and the removal due to the rapid-action clamping device. The cover panel with interengaging partial cover panels allows an installation without the removal of adjacent components.

As a supplement, it should be noted that "comprising" does not exclude any other elements or steps and that "a" or "an" does not exclude a plurality. It should furthermore be noted that characteristics or steps that were described with reference to one of the above embodiments can also be used in combination with other characteristics or steps of other above-described embodiments. The reference symbols in the claims should not be interpreted in a restrictive sense.

The invention claimed is:

1. A mobile aircraft cabin divider, comprising:
   a first wall section;
   a second wall section;
   a cable duct; and
   a holding device;
   wherein the second wall section is arranged substantially parallel to the first wall section;
   wherein the cable duct is arranged between the first wall section and the second wall section;
   wherein the cable duct protrudes over an edge of the first wall section and an edge of the second wall section in at least one location;
   wherein the holding device is fixed to a stationary aircraft cabin installation;
   wherein the holding device comprises at least one flat region, wherein the flat region comprises a recess and the recess can be penetrated by the cable duct;
   wherein the cable duct is designed such that forces acting upon the mobile divider can be diverted to stationary installations of the cabin;
   wherein the recess provides a floating bearing with respect to the cable duct; and
   wherein the floating bearing has degrees of freedom orthogonally to the flight direction, but no degrees of freedom in the flight direction.

2. The mobile aircraft cabin divider of claim 1, wherein the recess comprises an edge region that is covered with an elastic collar such that the collar at least partially lies between the edge region of the recess and the cable duct.

3. The mobile aircraft cabin divider of claim 1, wherein the cable duct has an elongate cross section, the longest dimension of which extends in the direction of a dimension of the wall sections.

4. The mobile aircraft cabin divider of claim 1, wherein the holding device comprises at least one clamping device that is mountable on a stationary cabin element.

5. The mobile aircraft cabin divider of claim 4, wherein the clamping device comprises a rapid-action closure that is mountable on a stationary cabin element.

6. The mobile aircraft cabin divider of claim 5, wherein the rapid-action closure comprises an eccentric clamping device.

7. The mobile aircraft cabin divider of claim 4, wherein the clamping device comprises clamping jaws connectable to a profile of a stationary cabin element in a non-positive and at least partially positive fashion.

8. The mobile aircraft cabin divider of claim 1, further comprising a cover panel separably connectable on a side of the holding device that faces the first wall section and the second wall section, wherein the cover panel comprises a recess that can be penetrated by the cable duct.

9. The mobile aircraft cabin divider of claim 8, wherein the cover panel comprises at least one first partial panel and one second partial panel that can be engaged with the first partial panel, wherein the partial panels encompass the recess in the cover panel in the engaged state.

10. The mobile aircraft cabin divider of claim 1, wherein the mobile divider comprises at least one lead-through for routing a line to be installed in the cable duct through at least one of the first wall section and the second wall section.

11. An aircraft comprising a mobile divider, the mobile divider comprising:
    a first wall section;
    a second wall section; and
    a cable duct;
    wherein the second wall section is arranged substantially parallel to the first wall section;
    wherein the cable duct is arranged between the first wall section and the second wall section;
    wherein the cable duct protrudes over an edge of the first wall section and an edge of the second wall section in at least one location;
    wherein the holding device is fixed to a stationary aircraft cabin installation;
    wherein the holding device comprises at least one flat region, wherein the flat region comprises a recess and the recess can be penetrated by the cable duct;
    wherein the cable duct is designed such that forces acting upon the mobile divider can be diverted to stationary installations of the cabin;
    wherein the recess provides a floating bearing with respect to the cable duct; and
    wherein the floating bearing has degrees of freedom orthogonally to the flight direction, but no degrees of freedom in the flight direction.

* * * * *